(12) United States Patent
Molina et al.

(10) Patent No.: US 7,860,146 B2
(45) Date of Patent: Dec. 28, 2010

(54) ADAPTATIVE MULTI-CARRIER CODE DIVISION MULTIPLE ACCESS

(75) Inventors: Jose Abad Molina, Malaga (ES); Juan Carlos Riveiro Insua, Barcelona (ES); Jonathan Ephraim David Hurwitz, Edinburgh (GB)

(73) Assignee: Gigle Networks, Inc., Redwood City, CA (US)

( * ) Notice: Subject to any disclaimer, the term of this patent is extended or adjusted under 35 U.S.C. 154(b) by 858 days.

(21) Appl. No.: 11/482,373

(22) Filed: Jul. 6, 2006

(65) Prior Publication Data

US 2008/0008081 A1    Jan. 10, 2008

(51) Int. Cl.
*H04B 1/00* (2006.01)
*H04B 7/216* (2006.01)
*H04K 27/28* (2006.01)
*H04W 4/00* (2009.01)

(52) U.S. Cl. .................. 375/130; 375/260; 370/332; 370/335; 370/342

(58) Field of Classification Search ............... 375/130, 375/222, 260; 370/203, 335, 342, 432; 455/126, 455/402
See application file for complete search history.

(56) References Cited

U.S. PATENT DOCUMENTS

| | | | |
|---|---|---|---|
| 3,379,973 A | 4/1968 | Walton | |
| 3,445,763 A | 5/1969 | Harris, Jr. | |
| 4,096,361 A | 6/1978 | Crawford | |
| 4,224,483 A | 9/1980 | Neigh et al. | |
| 4,430,731 A | 2/1984 | Gimple et al. | |
| 4,636,711 A | 1/1987 | Freymuth | |
| 4,636,771 A | 1/1987 | Ochs | |
| 4,772,870 A | 9/1988 | Reyes | |
| 4,922,534 A | 5/1990 | Gorniak et al. | |
| 5,287,065 A | 2/1994 | Allfather | |
| 5,574,748 A | 11/1996 | Vander Mey et al. | |
| 5,732,223 A | 3/1998 | Moore et al. | |
| 5,777,544 A | 7/1998 | Vander Mey et al. | |
| 5,880,631 A | 3/1999 | Sahota | |

(Continued)

FOREIGN PATENT DOCUMENTS

EP    0580457 A1    1/1994

(Continued)

OTHER PUBLICATIONS

Tang, C.; Stolpman, V.J.; , "Multiple users adaptive modulation schemes for MC-CDMA," Global Telecommunications Conference, 2004. GLOBECOM '04. IEEE , vol. 6, No., pp. 3823-3827 vol. 6, Nov. 29-Dec. 3, 2004.*

(Continued)

*Primary Examiner*—Mohammad H Ghayour
*Assistant Examiner*—Eboni Giles
(74) *Attorney, Agent, or Firm*—Peters Verny, LLP

(57) ABSTRACT

A system for performing adaptative multi-carrier code division multiple access (AMC-CDMA) includes first circuitry and modulator circuitry. The first circuitry determines a channel performance metric for each of a plurality of channels. The first circuitry determines at least one parameter of bit loading for each of the channels based on the channel performance metric. The modulator circuitry modulates AMC-CDMA signals using the parameters for bit loading in each of the channels for transmission over a wired connection.

20 Claims, 5 Drawing Sheets

U.S. PATENT DOCUMENTS

| | | | |
|---|---|---|---|
| 5,929,750 | A | 7/1999 | Brown |
| 5,929,896 | A | 7/1999 | Goodman et al. |
| 5,933,071 | A | 8/1999 | Brown |
| 5,978,371 | A | 11/1999 | Mason |
| 6,014,386 | A | 1/2000 | Abraham |
| 6,215,987 | B1 | 4/2001 | Fujita |
| 6,243,413 | B1 | 6/2001 | Beukema |
| 6,353,628 | B1 | 3/2002 | Wallace et al. |
| 6,373,377 | B1 | 4/2002 | Sacca et al. |
| 6,407,987 | B1 | 6/2002 | Abraham |
| 6,411,163 | B1 | 6/2002 | Enriquez |
| 6,593,868 | B2 | 7/2003 | Clara et al. |
| 6,957,086 | B2 | 10/2005 | Bahl et al. |
| 6,985,715 | B2 | 1/2006 | Lee |
| 7,005,943 | B2 | 2/2006 | Cern |
| 7,042,351 | B2 | 5/2006 | Kline |
| 7,053,756 | B2 | 5/2006 | Mollenkopf et al. |
| 7,075,414 | B2 | 7/2006 | Giannini et al. |
| 7,079,537 | B1 | 7/2006 | Kanuri et al. |
| 7,221,196 | B2 | 5/2007 | Shirani |
| 7,248,148 | B2 | 7/2007 | Kline et al. |
| 7,269,403 | B1 * | 9/2007 | Miao .......................... 455/402 |
| 7,391,317 | B2 | 6/2008 | Abraham et al. |
| 7,602,220 | B1 | 10/2009 | Bonfill-Petit et al. |
| 7,725,096 | B2 | 5/2010 | Riveiro et al. |
| 2002/0010870 | A1 | 1/2002 | Gardner |
| 2002/0026528 | A1 | 2/2002 | Lo |
| 2002/0145996 | A1 | 10/2002 | Robinson et al. |
| 2002/0154000 | A1 | 10/2002 | Kline |
| 2002/0174423 | A1 | 11/2002 | Fifield et al. |
| 2002/0181437 | A1 | 12/2002 | Ohkubo et al. |
| 2003/0016123 | A1 | 1/2003 | Tager et al. |
| 2003/0062990 | A1 | 4/2003 | Schaeffer, Jr. et al. |
| 2003/0114153 | A1 | 6/2003 | Shaver et al. |
| 2003/0129978 | A1 | 7/2003 | Akiyama et al. |
| 2003/0133473 | A1 | 7/2003 | Manis et al. |
| 2003/0169155 | A1 | 9/2003 | Mollenkopf et al. |
| 2003/0184433 | A1 | 10/2003 | Zalitzky et al. |
| 2003/0203721 | A1 * | 10/2003 | Berezdivin et al. .......... 455/126 |
| 2003/0224728 | A1 | 12/2003 | Heinonen et al. |
| 2004/0003338 | A1 | 1/2004 | Kostoff et al. |
| 2004/0022304 | A1 | 2/2004 | Santhoff et al. |
| 2004/0032320 | A1 | 2/2004 | Zalitzky et al. |
| 2004/0047427 | A1 | 3/2004 | Dostert et al. |
| 2004/0056734 | A1 | 3/2004 | Davidow |
| 2004/0077353 | A1 | 4/2004 | Mahany |
| 2004/0107588 | A1 | 6/2004 | Pu |
| 2004/0113756 | A1 | 6/2004 | Mollenkopf |
| 2004/0113757 | A1 | 6/2004 | White, II et al. |
| 2004/0174851 | A1 | 9/2004 | Zalitzky et al. |
| 2004/0213237 | A1 | 10/2004 | Yasue et al. |
| 2004/0220766 | A1 | 11/2004 | Harbord et al. |
| 2004/0246107 | A1 | 12/2004 | Kline |
| 2005/0018668 | A1 | 1/2005 | Cheriton |
| 2005/0020227 | A1 | 1/2005 | Kumagawa et al. |
| 2005/0031047 | A1 * | 2/2005 | Maltsev et al. .............. 375/260 |
| 2005/0089061 | A1 | 4/2005 | Logvinov et al. |
| 2005/0094647 | A1 | 5/2005 | Hata et al. |
| 2005/0141473 | A1 * | 6/2005 | Lim et al. .................... 370/342 |
| 2005/0143973 | A1 | 6/2005 | Taniguchi et al. |
| 2005/0157670 | A1 * | 7/2005 | Tang et al. .................. 370/320 |
| 2005/0174950 | A1 | 8/2005 | Ayyagari |
| 2005/0190826 | A1 * | 9/2005 | Van Bruyssel et al. ...... 375/222 |
| 2005/0213874 | A1 | 9/2005 | Kline |
| 2005/0249245 | A1 | 11/2005 | Hazani et al. |
| 2006/0038662 | A1 | 2/2006 | White, II et al. |
| 2006/0045066 | A1 | 3/2006 | Choi et al. |
| 2006/0097574 | A1 | 5/2006 | Gidge et al. |
| 2006/0106961 | A1 | 5/2006 | Ebata et al. |
| 2006/0120399 | A1 | 6/2006 | Claret et al. |
| 2006/0126617 | A1 | 6/2006 | Cregg et al. |
| 2006/0146866 | A1 | 7/2006 | Horvath et al. |
| 2006/0176898 | A1 | 8/2006 | Chan et al. |
| 2006/0291575 | A1 | 12/2006 | Berkman et al. |
| 2007/0002771 | A1 | 1/2007 | Berkman et al. |
| 2007/0008972 | A1 | 1/2007 | Sifnatsch et al. |
| 2007/0025386 | A1 | 2/2007 | Riedel et al. |
| 2007/0060151 | A1 | 3/2007 | Lee et al. |
| 2007/0076595 | A1 | 4/2007 | Lee et al. |
| 2007/0268124 | A1 | 11/2007 | Berkman |
| 2008/0001801 | A1 | 1/2008 | Nhuyen |
| 2009/0022175 | A1 | 1/2009 | Logvinov et al. |

FOREIGN PATENT DOCUMENTS

| | | | |
|---|---|---|---|
| EP | 1134909 A1 | | 9/2001 |
| EP | 1351408 B1 | | 10/2003 |
| EP | 1388954 A2 | * | 2/2004 |
| EP | 1531568 | * | 5/2005 |
| EP | 1531568 A1 | * | 5/2005 |
| EP | 1388954 | * | 6/2005 |
| EP | 1548974 A2 | * | 6/2005 |
| EP | 1432138 B1 | | 9/2005 |
| WO | 0195518 A2 | | 12/2001 |
| WO | 03015291 A2 | | 2/2003 |
| WO | 03077443 A1 | | 9/2003 |
| WO | 03092212 A1 | | 11/2003 |
| WO | 2004100392 A1 | | 11/2004 |
| WO | 2005039070 A2 | | 4/2005 |
| WO | 2006017743 A2 | | 2/2006 |
| WO | 2006074174 A1 | | 7/2006 |

OTHER PUBLICATIONS

Crussiere, M.; Baudais, J.-Y.; Helard, J.-F.; , "Robust and high-bit rate communications over PLC channels: a bit-loading multi-carrier spread-spectrum solution," Power Line Communications and Its Applications, 2005 International Symposium on , vol., No., pp. 37-41, Apr. 6-8, 2005.*

Cheong Yui Wong; Cheng, R.S.; Lataief, K.B.; Murch, R.D.; , "Multiuser OFDM with adaptive subcarrier, bit, and power allocation," Selected Areas in Communications, IEEE Journal on , vol. 17, No. 10, pp. 1747-1758, Oct. 1999.*

Yukitoshi, Sanada, A Multiuser Interference Cancellation Technique Utilizing Convolutional Colds and Orthogonal Multicarrier Modulation for Wireless Indoor Communications, IEEE Journal of Selected Areas in Communications, vol. 14, No. 8, Oct. 1996, pp. 1500-1508.

Gardner, S., et al., HomePlug Standard Brings Networking to the Home, CSD, Dec. 2000.

UPA—Universal Powerline Association, Frequently Asked Questions, date unknown.

Powerstream Technology Background, Adaptive Networks, Inc., 2002.

Stelts, Michael, CEPCA Standard Summary, 2006.

Digital Home Statndard, Universal Powerline Association (UPA), 2005.

Powerline Communications Systems-Access/In-home & In-home/ In-home Coexistence Mechanism-General Specifications, Universal Powerline Association (UPA), Jun. 27, 2005.

Opera Technology Specification—Part 1, Open PLC European Research Alliance (OPERA), Jan. 31, 2006.

Opera System Specification—Part 2, Open PLC European Research Alliance (OPERA), Jan. 31, 2006.

HomePlug 1.0 Technology White Paper, HomePlug Powerline Alliance.

HomePlug AV White Paper, HomePlug Powerline Alliance, 2005.

Juttner, A., et al., Tree Based Broadcast in Ad Hoc Networks, Sep. 9, 2004, pp. 1-21, Errisson Research, Traffic Analysis and Network Performance Laboratory, Budapest, Hungary.

Kouvatsos, D., et al., Broadcasting Methods in Ad Hoc Networks: An Overview, Proceedings of the 3rd International Working conference on Performance Modelling and Evaluation of Heterogeneous Networks, Jul. 20, 2005, pp. 1-14.

International Preliminary Report on Patentability for PCT/US2007/ 015508, Jan. 15, 2009.

International Search Report for PCT/US2007/015508, Feb. 6, 2008.
"Broadband Powerline Communications Systems, A Background Brief," Australian Communications Authority, Sep. 2003.
Int'l Preliminary Report on Patentability, PCT/US2007/016736, Dated Jan. 27, 2009.
Int'l Search Report, PCT/GB2006/003665, Dated Mar. 12, 2007.
Written Opinion, PCT/GB2006/003665, Dated Apr. 3, 2008.
Int'l Search Report, PCT/US2008/00020, Dated Oct. 2, 2008.
Written Opinion, PCT/US2008/00020, Dated Apr. 14, 2008.
Int'l Search Report, PCT/GB2008/050364, Dated Aug. 19, 2008.
Int'l Search Report, PCT/GB2008/050365, Dated Aug. 13, 2008.
PCT/EP2009/057284 Int'l Search Report and Written Opinion, Dated Aug. 28, 2009.
Int'l Search Report and Written Opinion, PCT/US09/48090, Dated Dec. 2, 2009.
Int'l Search Report and Written Opinion, PCT/US09/60478, Dated Dec. 3, 2009.
Int'l Search Report and Written Opinion, PCT/US09/60482, Dated Dec. 2, 2009.
Int'l Search Report and Written Opinion, PCT/US10/24125, Dated Apr. 15, 2010.
U.S. Appl. No. 12/581,547, filed Oct. 19, 2009, Danesh, Improved Wireline Transmission Circuit.
U.S. Appl. No. 12/770,586, filed Apr. 29, 2010, Hurwitz, Multi-Wideband Communications Over Power Lines.
U.S. Appl. No. 12/705,182, filed Feb. 12, 2010, Rocamora, External AC-DC Coupling Unit For Communication Interfaces.
U.S. Appl. No. 12/639,900, filed Dec. 16, 2009, Bofill-Petit, Differential Gm-Boosting.
U.S. Appl. No. 12/771,805, filed Apr. 30, 2010, Molina, Adaptive Multi-Carrier Code Division Multiple Access.

* cited by examiner

ADAPTATIVE MULTI-CARRIER CODE DIVISION MULTIPLE ACCESS

BACKGROUND

1. Technical Field

The present invention relates generally to communication signal processing and more particularly to systems and methods for adaptative multi-carrier code division multiple access.

2. Description of Related Art

Code Division Multiple Access (CDMA) encodes data with a special code for each channel. CDMA provides greater capacity and security in a variety of communications systems such as radio systems, networking systems, and wireless communications systems. One limitation with CDMA is the difficulty in achieving high performance due to channel impairments. Orthogonal Frequency Division Multiplexing (OFDM) splits a datastream into multiple radio frequency channels, which are each sent over sub-carrier frequencies that are orthogonal to one another.

OFDM has been used in residential power line communications and in Asymmetric Digital Subscriber Line communications. One example of a power line communication system using OFDM uses a large number of carriers that is greater than 1000 to achieve 200 Mbps. Because of the large number of carriers, the OFDM communication system has a high peak-to-average ratio. This OFDM communication system is robust against delay spread (cyclic prefix) and has high throughput. One limitation with OFDM is the high cost to achieve this high throughput. This example of a residential power line communication system uses a 2-30 MHz band that has a high delay spread and is regulated for injection of high power spectral density (PSD). With a high PSD, dynamic notches or power suppression are typically implemented to avoid interferences over amateur radio communications. In this example, there is high spectral efficiency but increasing performance such as beyond 9 bit/Hz increases costs.

Combining the OFDM with the CDMA results in Multi-Carrier Code Division Multiple Access (MC-CDMA). In the MC-CDMA, each symbol is spread over multiple carriers with a special code, or each symbol is spread over the same frequency over time. One limitation is that high performance cannot be achieved due to channel impairments.

SUMMARY OF THE INVENTION

The invention addresses the above problems by performing adaptative multi-carrier code division multiple access. A system for performing adaptative multi-carrier code division multiple access (AMC-CDMA) includes first circuitry and modulator circuitry. The first circuitry determines a channel performance metric for each of a plurality of channels. The first circuitry determines at least one parameter of bit loading for each of the channels based on the channel performance metric. The modulator circuitry modulates AMC-CDMA signals using the parameters for bit loading in each of the channels for transmission over a wired connection.

The parameters of bit loading may be a number of code division multiple access sequences over a carrier, a length of a code division multiple access sequence, and a number of bits of a constellation of modulation. Some examples of the channel performance metric are signal-to-noise ratio and bit error rate. The wired connection may be a power line connection, where the frequencies of the AMC-CDMA signals are above 30 MHz.

A method for performing AMC-CDMA includes the steps of determining a channel performance metric for each of a plurality of channels and determining at least one parameter of bit loading for each of the channels based on the channel performance metric. The method also includes modulating AMC-CDMA signals using the parameters for each of the channels and transmitting the AMC-CDMA signals over a wired connection.

One advantage is that the AMC-CDMA provides adaptive modulation for multiple network nodes according to the channel quality. Another advantage is the low implementation cost of AMC-CDMA based on increasing the number of CDMA sequences, which increases the number of carriers but not the number of FFT points.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for performing adaptative multi-carrier code division multiple access (AMC-CDMA) includes first circuitry and modulator circuitry. The first circuitry determines a channel performance metric for each of a plurality of channels. The first circuitry determines at least one parameter of bit loading for each of the channels based on the channel performance metric. The modulator circuitry modulates AMC-CDMA signals using the parameters for bit loading in each of the channels for transmission over a wired connection.

Adaptative Multi Carrier Code Division Multiple Access (AMC-CDMA) is modulation of multi-carriers using CDMA that applies a different bit loading in each carrier according to channel performance metrics in every carrier. One example of a channel performance metric is SNR. CDMA is used to modulate and multiplex different bits per each carrier instead of using standard modulation such as M-QAM and M-DPSK.

One advantage is that the AMC-CDMA provides adaptive modulation for multiple network nodes according to the channel quality. Another advantage is the low implementation cost of AMC-CDMA based on increasing the number of CDMA sequences, which increases the number of carriers but not the number of FFT points. Some other advantages are the low Power Spectral Density (PSD) from spread spectrum systems and the robustness against frequency selective channels from OFDM modulations.

The AMC-CDMA also allows several users at the same time by advantageously using different frequencies and allows the same frequencies with different codes. By multiplexing several users at the same time, every user is either using different carriers in frequency or in code, having a different set of code per each user. In multipoint to multipoint applications, allowing several users at the same time can be important, where the latency is an important factor from the application and cost point of view. This advantage may be especially important in power line communications where the network topologies can be mesh/adhoc networks (where every node can be a repeater).

Figure 1:
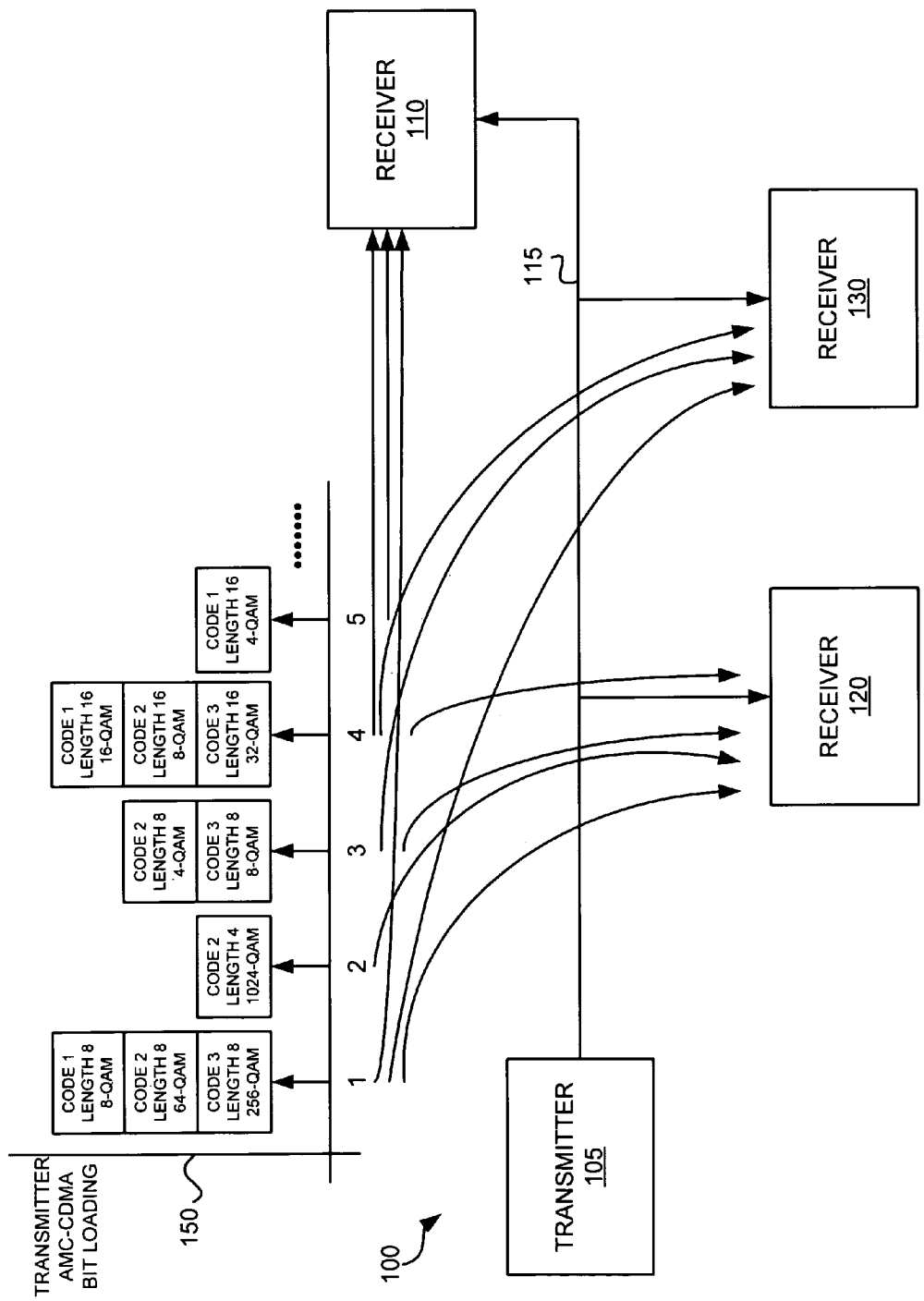
FIG. 1 is an illustration of a communication system in an embodiment of the invention.

FIG. 1 depicts an illustration of a communication system 100 in an embodiment of the invention. The communication system 100 includes a transmitter 105, a receiver 110, a receiver 120, and a receiver 130. The transmitter 105 is coupled to the receiver 110, the receiver 120, and the receiver 130 by power grid channel 115.

Figure 2:
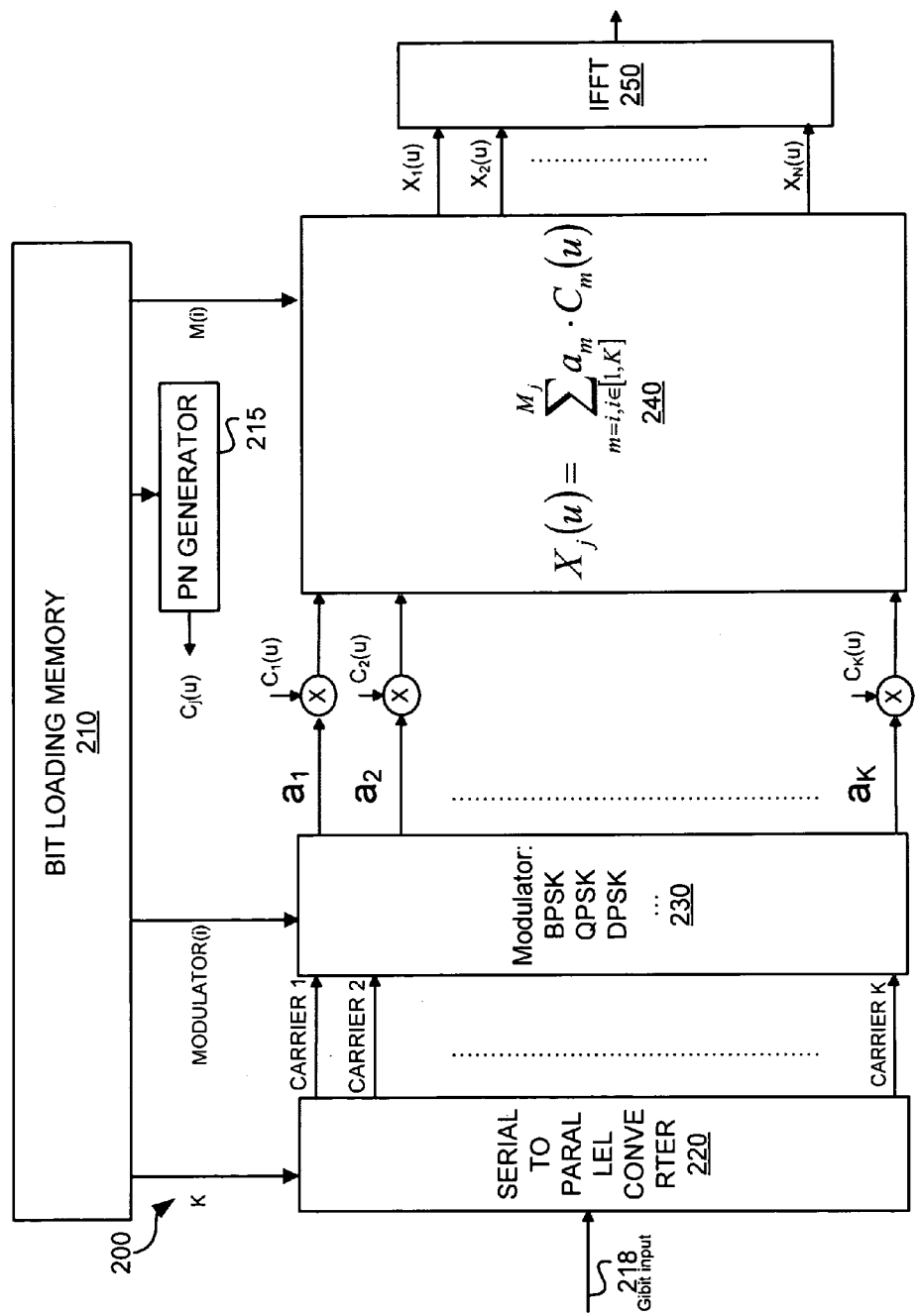
FIG. 2 is an illustration of a transmitter in an embodiment of the invention.
Figure 3:
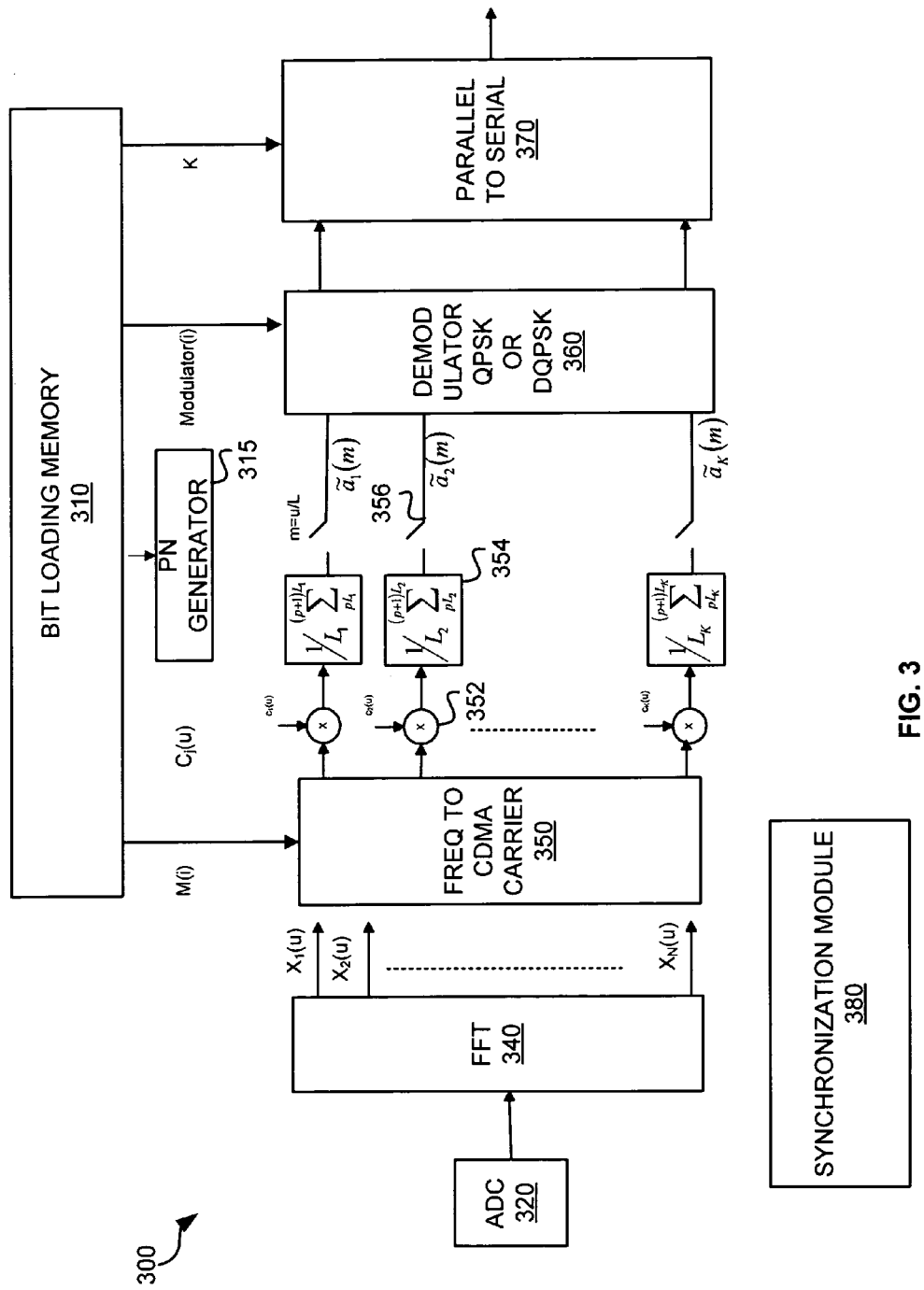
FIG. 3 is an illustration of a receiver in an embodiment of the invention.

The embodiments in FIGS. 1-3 depict an example of communication from the transmitter 110 to the receivers 110, 120, and 130. Other embodiments may include communications between multiple transmitters and multiple receivers. Furthermore, other embodiments may include transceivers that transmit and receive. While there are numerous variations where the communications can be transmitted to and received from, the figures below describe one example of communication from the transmitter 105 to the receivers 110, 120, and 130 for the sake of simplicity.

FIGS. 1-3 depict one example of communications in a residential power line communication system. In this example, the residential power line communication system has two frequency bands. A first low band operates in the frequency range of 1 MHz to 30 MHz. This low band is regulated by Electromagnetic Compatibility (EMC) regulations for power lines. The high band is a non-regulated frequency band except for general EMC regulations. One advantage of this non-regulated high band is the ability to allow for low power spectral density. In this example, the AMC-CDMA is used in the high band. In this high band, the AMC-CDMA modulation is used to transmit high data rate over a power line, while minimizing the injected power and maximizing the data rate. By using a non-regulated band for power line communications, the transmission levels allowed in this non-regulated band are much lower than in the regulated band. Other embodiments may employ AMC-CDMA in bands other than just the high, non-regulated band. Furthermore, other embodiments may employ AMC-CDMA in other wired and/or wireless communications systems besides power line communications. One example of a wired communications system includes coaxial connections.

The transmitter 105 is any device or system configured to encode signals by AMC-CDMA and transmit those signals. One example of the transmitter 105 is discussed in more detail below in FIG. 2. The receivers 110, 120, and 130 are any devices or systems configured to receive signals and decode the signals by AMC-CDMA. One example of the receivers 110, 120, 130 is discussed in more detail below in FIG. 3.

Graph 150 represents carriers and codes in the bit loading of AMC-CDMA. Codes 1, 2, and 3 from carrier 1 are respectively used in communications with the receiver 110, the receiver 120, and the receiver 130. Code 2 from carrier 2 is used in communications with the receiver 120. Codes 2 and 3 from carrier 3 are respectively used in communications with the receiver 120 and the receiver 130. Codes 1, 2, and 3 from carrier 4 are respectively used in communications with the receiver 110, the receiver 120, and the receiver 130. Code 1 from carrier 5 is used in communications with the receiver 110. Other codes and carriers are not shown for the sake of simplicity.

The graph 150 depicts the variables of AMC-CDMA that can be changed to optimize communications between the transmitter 110 and the receivers 120, 130, and 140. The first variable is a number of bits for each constellation in QAM. For example, in carrier 1, code 1 has a modulation of 8-QAM, code 2 has a modulation of 64-QAM, and code 3 has a modulation of 256-QAM. Another variable is the length of the CDMA sequence. The codes 1-3 in carrier 1 have a length of 8, while the code 2 in carrier 2 has a length of 4. The codes 1-3 in channel 4 have a length of 16.

FIG. 2 depicts an illustration of a transmitter 200 in an embodiment of the invention. The blocks of the transmitter 200 may represent functional blocks that can be implemented in circuitry such as digital signal processors and field programmable gate arrays, or alternatively, the blocks of the transmitter 200 may represent dedicated circuitry. The transmitter 200 includes a bit loading memory 210, a pseudo noise (PN) generator 215, a serial to parallel converter 220, a modulator 230, multipliers 235, a summarizer 240, and an inverse Fast Fourier Transform (IFFT) 250.

The transmitter 200 provides adaptive CDMA modulation on top of each carrier. In order to adapt the transmission rate and modulation scheme to the channel conditions, the parameters of the bit loading for CDMA modulation can be changed based on the metrics of the channels' performance such as SNR. This AMC-CDMA increases immunity against delay spread and impulsive noise. The AMC-CDMA also allows multiple users. The AMC-CDMA modulation uses a multi-carrier that applies different bit loading over each carrier.

The bit loading memory 210 provides parameters for the AMC-CDMA modulation. The bit loading memory 210 may store these parameters of the AMC-CDMA modulation. In some embodiments, circuitry (not shown) executing firmware determines a channel performance metric for each of a plurality of channels through communications between the transmitter 200 and the receiver 300 discussed below in FIG. 3. A channel performance metric is any measurement or value that is indicative of the operation, quality, condition, or status of a channel in communications. Some examples of channel performance metrics are signal to noise ratio (SNR), bit error rates, attenuation measurements, and other noise measurements. In this example, the channel performance metrics comprise the SNRs of every channel. The circuitry also determines at least one parameter of bit loading for each of the channels based on the channel performance metric. The parameters can then be stored in the bit loading memory 210.

A parameter of bit loading is any number or value that indicates how a bit of data is loaded in communications. In this example, the four adaptive parameters for bit loading are the number of CDMA sequences over the same frequency carrier, the length of the CDMA sequence, the number of bits of each constellation, and the length of the chip in a CDMA sequence. Varying these parameters can increase the bandwidth of each carrier and the total number of carriers. Some of these parameters may change while other parameters do not change.

The first parameter is the number of CDMA sequences per carrier. Each CDMA sequence is the result of the modulation of n-bits of information by one CDMA sequence. In every carrier, it can be multiplexed as a maximum (i.e. to maintain orthogonality among all codes) M-CDMA sequence, where M is the result of $2^L$ and L is the CDMA length or the number of multi-carrier symbols that are included in the CDMA sequence. Increasing the number of CDMA sequences increases the number of carriers but not the number of FFT points, which advantageously provides a low implementation cost of AMC-CDMA. Thus, AMC-CDMA provides a low cost implementation of a multi-carrier system with a variable number of carriers. The equation below is for the final number of carriers, K:

$$K = \sum_{j=1}^{N} M_j$$

$M_j$ is the number of CDMA sequences that the frequency j is transmitting at the same time. Therefore, the system is able to change the total number of carriers according to the SNR of the channel.

The second parameter is the length of the CDMA sequence. Changing the length of the CDMA sequence improves robustness versus noise. This parameter can change the modulation in real time to adapt the transmitter 200 to the channels' performance. The time to transmit data and the latency increase, while the processing gain of the system also increases. Thus, the spreading factor of the CDMA sequence can increase, which increases the robustness versus noise and channel delay spread or inter-symbol interference (ISI).

The third parameter is the number of bits of each constellation or constellation size. By varying the three parameters, the transmitter 200 using AMC-CDMA can adapt by increasing or decreasing the latency or overhead according to the channel conditions. Thus, AMC-CDMA can provide a multi-carrier system with a high number of carriers but with an implementation cost similar to one with a much lower number of carriers. One possible constraint may be that the robustness versus ISI/delay spread of the channel may be mainly limited by the number of the core multi-carrier modulation. However, CDMA sequences help to reduce the impact of the ISI.

A fourth parameter is the length of the chip in the CDMA sequence. When all the chips have the same length, and the length of the chip is 1, one of the chips of the CDMA in one OFDM symbol is transmitted. The chip length can be varied in integer numbers in order to achieve more robustness against the delay spread and other channel impairments, where the chip of the CDMA is shared during several OFDM symbols. This parameter may be chosen independently for every FFT frequency or point.

The following equation is for bits/carrier:

Bits/carrier=$n*M/(L*chiplength)$ where n is the constellation number of bits;

M is the number of CDMA sequences over the same carrier;

L is length of the CDMA sequence; and chiplength is the length of the CDMA chip.

In operation, the serial to parallel converter 220 receives a gigabit incoming bit stream over link 218. The serial to parallel converter 220 also receives the number of virtual carriers, K, from the bit loading memory 210. The number of virtual carriers, K, is calculated based on the total number of CDMA sequences and the number of physical carriers. The serial to parallel converter 220 divides the gigabit incoming bit stream into K carriers. In one example, the number of carriers is 250, which is over 200 MHz. This example also has a low constellation size. This example advantageously is robust against the delay spread, has a relatively low peak-to-average ratio (PAR), and has low complexity for an analog front end and a digital front end.

The modulator 230 then modulates the carriers based on the Modulator(i) input to result in the modulated carrier signals, $a_k$. Each $a_k$ signal is a point in the constellation. The Modulator(i) input indicates the type of modulation and the constellation size of each carrier. Some examples of the modulation schemes are Binary Phase Shifting Key (BPSK), Quaternary Phase Shift Keying (QPSK), and Differential Phase Shift Keying (DPSK).

The PN generator 215 generates the PN codes, $C_j(u)$. The multipliers 235 multiply the modulated carrier signals, $a_k$ with the PN codes, $C_j(u)$. The summarizer 240 sums up the dot products of the modulated carrier signals, $a_k$ and the PN codes, $C_j(u)$ based on the M(i) input. The summarizer 240 groups the virtual carriers for each frequency. The M(i) input is the number of CDMA sequences for a frequency. The summarizer 240 generates the $X_N(u)$ signals for the physical carriers.

The IFFT 250 then performs an inverse fast fourier transform function on the $X_N(u)$ to change from the frequency domain to the time domain. A cyclix prefix insertion block may then append cyclix prefixes to the resulting signal. The resulting signal can then be converted with a digital to analog converter (not shown). The cyclix prefix or guard period may also be not included in the transmitter 200. In other embodiments, FFT can be used to implement the multicarrier modulation on top of the AMC-CDMA. Cordics may also be used instead of FFT to modulate and demodulate each carrier individually.

One advantage of this embodiment in FIG. 2 is that 1 Gbps is easy to achieve with 200 MHz and up to 5 bits/Hz. Another advantage is the low complexity of the CDMA (only need to multiply by 1 or –1) and the FFT due to the small number of carriers and low number of bits and operations. A further advantage is the low peak-to-average ratio because of the low number of bits in the ADC and DAC converter. Also, the transmitter 200 can work below 0 dB of the SNR with a processing gain of more than 10 dB.

FIG. 3 depicts an illustration of a receiver 300 in an embodiment of the invention. The blocks of the receiver 300 may represent functional blocks that can be implemented in circuitry such as digital signal processors and field programmable gate arrays, or alternatively, the blocks of the receiver 300 may represent dedicated circuitry. The receiver 300 includes a bit loading memory 310, a pseudo noise (PN) generator 315, an analog to digital converter (ADC) 320, a fast fourier transform (FFT) 340, a frequency to CDMA carrier converter 350, a multiplier 352, summarizers 354, switches 356, a demodulator 360, a parallel to serial converter 370, and a synchronization module 380.

The ADC 320 receives an incoming signal from the transmitter 200 of FIG. 2. The ADC 320 performs an analog to digital conversion on the incoming signal. A cyclix prefix removing block may then remove the cyclix prefixes from the signal. The FFT 340 then performs a fast fourier transform on the signal resulting in $X_N(u)$ signals. The frequency to CDMA carrier converter 350 converts the $X_N(u)$ signals from frequency to CDMA carriers based on the M(i) input.

The PN generator 315 generates the PN codes, $C_j(u)$. The multipliers 352 multiply the carrier signals from the converter 350 with the PN codes, $C_j(u)$. The summarizer 354 performs a calculation of $$\frac{1}{L_K} \sum_{pL_K}^{(p+1)L_K} .$$

The switch 356 switches the signal resulting in signal $\tilde{a}_K(m)$. The demodulator 360 then demodulates the signals $\tilde{a}_K(m)$ based on the input Modulator(i). Some examples of demodulation use QPSK and Differential Quadrature Phase Shift Keying (DQPSK). The parallel to serial converter 370 then performs a parallel to serial conversion. The synchronization module 380 performs synchronization functions to ensure synchronicity with a clock for the receiver 300.

Figure 4:
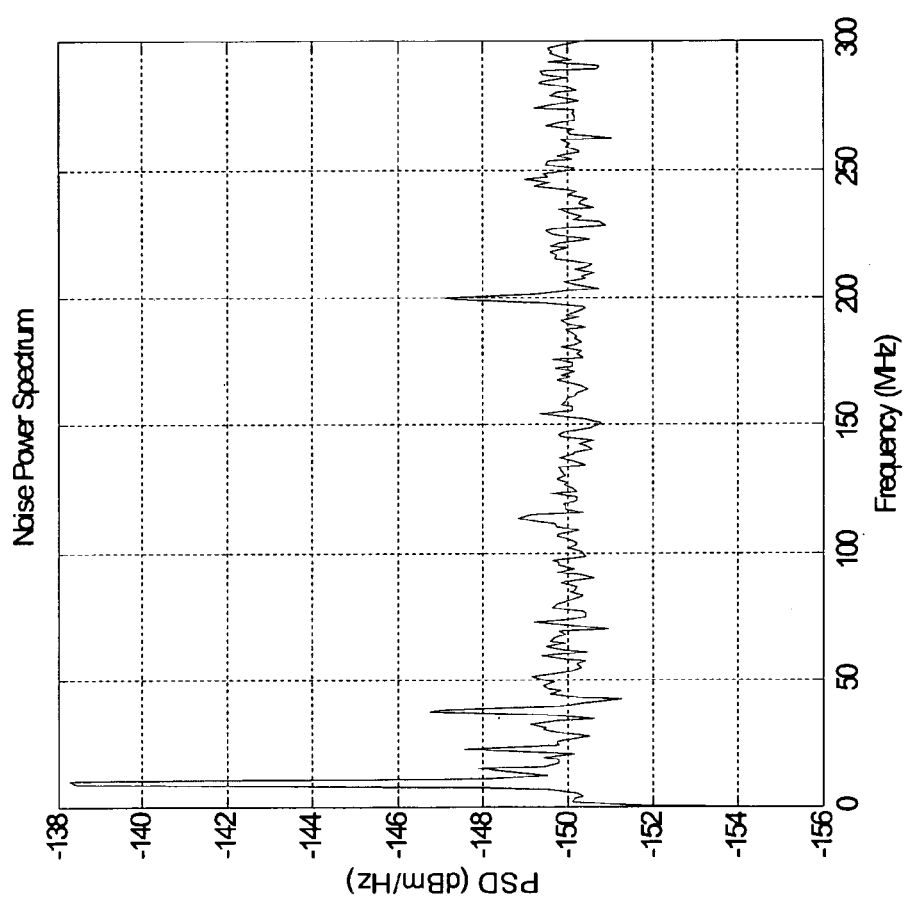
FIG. 4 is a noise power spectrum graph of frequency (in MHz) vs. Power Spectral Density (PSD) (in dBm/Hz) from an embodiment of the invention.

FIG. 4 depicts a noise power spectrum graph of frequency (in MHz) vs. Power Spectral Density (PSD) (in dBm/Hz)

from an embodiment of the invention. FIG. 4 depicts low noise for a channel operating under good conditions.

Figure 5:
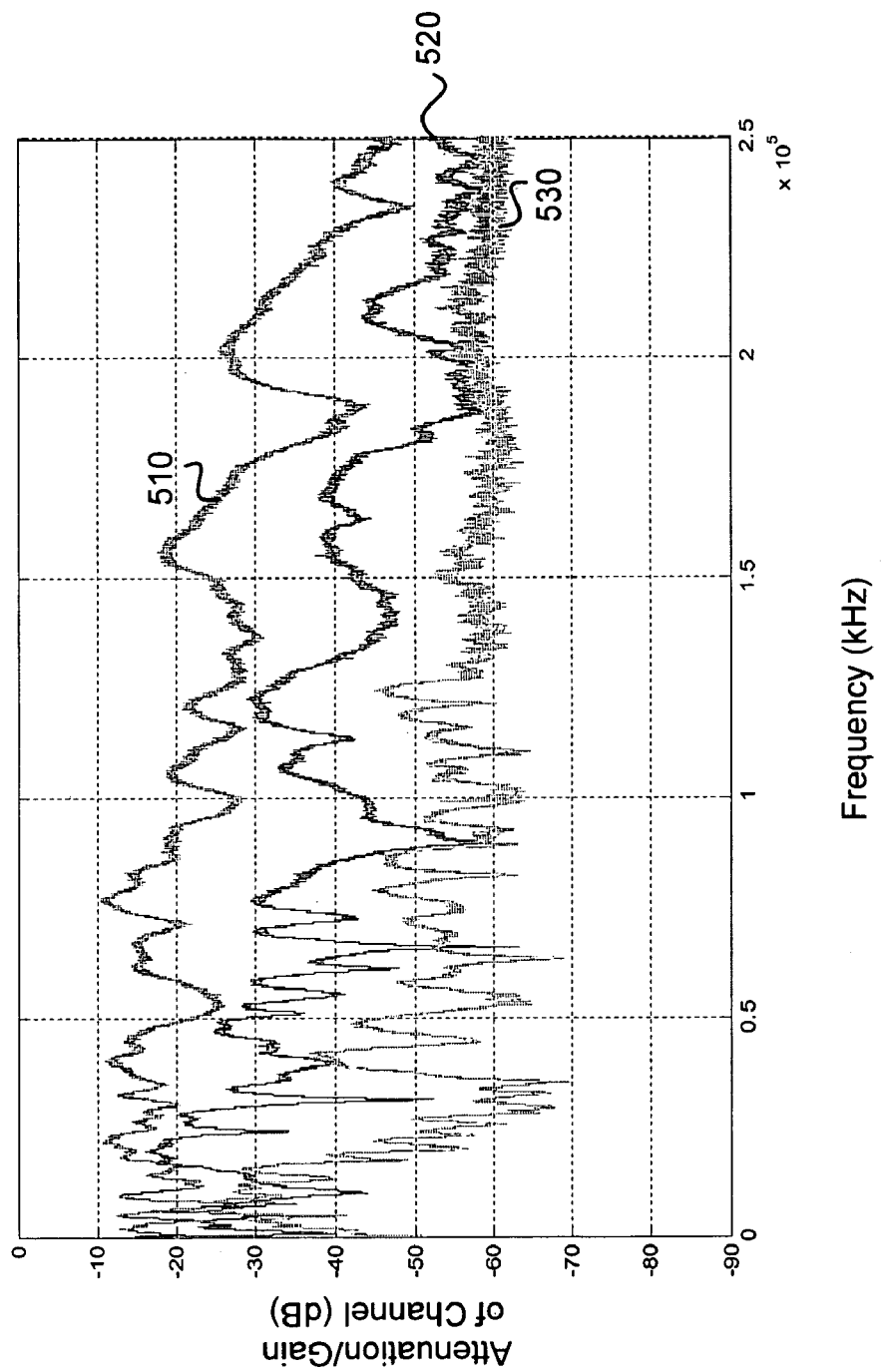
FIG. 5 is a channel response graph from an embodiment of the invention.

FIG. 5 depicts a channel response graph of frequency (in kHz) vs. attenuation (in dB) from an embodiment of the invention. The graph in FIG. 5 depicts a line 510 representing a channel under good conditions, a line 520 representing a channel under average conditions, and a line 530 representing a channel under bad conditions. FIGS. 4 and 5 can assist with calculations of signal to noise ratios for channels, which can be used for determining the parameters for AMC-CDMA.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for performing adaptative multi-carrier code division multiple access (AMC-CDMA), the system comprising:
   first circuitry configured to determine a channel performance metric for each of a plurality of carriers further configured to determine a number of CDMA sequences over the carrier, a length of a CDMA sequence, and a number of bits of a constellation of modulation, at least one of which being determined based on the determined channel performance metric; and
   modulator circuitry configured to modulate AMC-CDMA signals using the determined number of CDMA sequences over the carrier, a length of a CDMA sequence, and a number of bits of a constellation of modulation in each of the carriers for transmission over a wired connection.

2. The system of claim 1 wherein the channel performance metric comprises signal-to-noise ratio.

3. The system of claim 1 wherein the channel performance metric comprises bit error rate.

4. The system of claim 1 wherein the wired connection comprises a power line connection.

5. The system of claim 1 further comprising converter circuitry configured to convert a serial signal to a parallel signal.

6. The system of claim 1 further comprising code generator circuitry configured to generate codes for the AMC-CDMA signals.

7. The system of claim 1 further comprising inverse fast fourier transform (IFFT) circuitry configured to perform IFFT functions on the AMC-CDMA signals.

8. The system of claim 1 further comprising receiver circuitry configured to receive and decode the AMC-CDMA signals.

9. A method for performing adaptative multi-carrier code division multiple access (AMC-CDMA), the system comprising:
   determining a channel performance metric for each of a plurality of carriers;
   determining for each carrier of a plurality of carriers a number of CDMA sequences over the carrier, a length of a CDMA sequence, and a number of bits of a constellation of modulation, at least one of which being determined based on the determined channel performance metric; and
   modulating the AMC-CDMA signals using the determined number of CDMA sequences over the carrier, a length of a CDMA sequence, and a number of bits of a constellation of modulation in each of the carriers; and
   transmitting the AMC-CDMA signals over a wired connection.

10. The method of claim 8 wherein the channel performance metric comprises signal-to-noise ratio.

11. The method of claim 9 wherein the channel performance metric comprises bit error rate.

12. The method of claim 9 wherein the wired connection comprises a power line connection.

13. The method of claim 9 further comprising converting a serial signal to a parallel signal.

14. The method of claim 9 further comprising generating codes for the AMC-CDMA signals.

15. The method of claim 9 further comprising performing inverse fast fourier transform (IFFT) functions on the AMC-CDMA signals.

16. The method of claim 9 further comprising receiving and decoding the AMC-CDMA signals.

17. A transmitter comprising:
   a bit loading memory;
   firmware configured to measure a channel performance metric for each of a plurality of carriers;
   circuitry configured to
      determine a number of CDMA sequences for each of the plurality of carriers, each number of CDMA sequences being determined based on the channel performance metric measured for that carrier,
      determine a length of a CDMA sequence for each carrier of a plurality of carriers;
      determine a number of bits of a constellation of modulation for each carrier of a plurality of carriers;
      store the number of CDMA sequences for each carrier in the bit loading memory; modulator circuitry configured to modulate a signal in each of the plurality of carriers based on the number of CDMA sequences, the length of the CDMA sequence and the number of bits of a constellation of modulation for each carrier; and
   a power line connection configured to couple the modulator circuitry to a power line.

18. The transmitter of claim 17 further comprising a serial to parallel converter configured to receive a gigabit bit stream and a number of virtual carriers and further configured to divide the gigabit bit stream into the number of virtual carriers and provide the divided gigabit bit stream to the modulator circuitry.

19. The transmitter of claim 18 wherein the number of virtual carriers is calculated based on a total number of CDMA sequences.

20. The transmitter of claim 18 further comprising a pseudo noise generator configured to generate a pseudo noise code for each of the number of virtual carriers, and a summarizer configured to receive the dot products of the PN codes with the modulated carrier signals output by the modulator circuitry and further configured to receive the number of CDMA sequences for a frequency.

* * * * *

UNITED STATES PATENT AND TRADEMARK OFFICE
CERTIFICATE OF CORRECTION

PATENT NO.        : 7,860,146 B2                                          Page 1 of 1
APPLICATION NO.   : 11/482373
DATED             : December 28, 2010
INVENTOR(S)       : Jose Abad Molina et al.

It is certified that error appears in the above-identified patent and that said Letters Patent is hereby corrected as shown below:

Col. 8, line 7, in Claim 10: replace "claim 8" with --claim 9--

Signed and Sealed this
Third Day of July, 2012

David J. Kappos
*Director of the United States Patent and Trademark Office*